(12) United States Patent
Yamamoto et al.

(10) Patent No.: US 8,343,455 B2
(45) Date of Patent: Jan. 1, 2013

(54) FLAKY TITANIC ACID HAVING POLYMERIZABLE FUNCTIONAL GROUPS, SUSPENSION OF THE SAME, AND COATING FILMS MADE THEREFROM

(75) Inventors: Minoru Yamamoto, Tokushima (JP); Takuya Nomoto, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 980 days.

(21) Appl. No.: 11/990,735

(22) PCT Filed: Aug. 10, 2006

(86) PCT No.: PCT/JP2006/315801
§ 371 (c)(1),
(2), (4) Date: May 21, 2008

(87) PCT Pub. No.: WO2007/023680
PCT Pub. Date: Mar. 1, 2007

(65) Prior Publication Data
US 2009/0061257 A1    Mar. 5, 2009

(30) Foreign Application Priority Data

Aug. 25, 2005  (JP) .................................. 2005-244673

(51) Int. Cl.
*C01G 23/00* (2006.01)
(52) U.S. Cl. ............... 423/608; 423/82; 423/84; 516/90
(58) Field of Classification Search .................. 423/608, 423/82, 84; 516/90
See application file for complete search history.

(56) References Cited

U.S. PATENT DOCUMENTS

| | | | |
|---|---|---|---|
| 6,777,070 B1 | 8/2004 | Murata et al. | 428/323 |
| 2001/0024718 A1 | 9/2001 | Sasaki et al. | 428/325 |
| 2004/0234447 A1 | 11/2004 | Inubushi et al. | 423/598 |

FOREIGN PATENT DOCUMENTS

| | | |
|---|---|---|
| EP | 1 419 994 A1 | 5/2004 |
| JP | 3-505445 A | 11/1991 |
| JP | 4-335045 A | 11/1992 |
| JP | 2671949 B2 | 7/1997 |
| JP | 2979132 B2 | 9/1999 |
| JP | 3062497 B1 | 4/2000 |
| JP | 2001-270022 A | 10/2001 |
| JP | 2003-138145 | 5/2003 |
| JP | 2005-146007 * | 6/2005 |
| JP | 2005-146007 A | 6/2005 |
| WO | 90/11827 A1 | 10/1990 |
| WO | 99/11574 A1 | 3/1999 |
| WO | 03/037797 A1 | 10/2002 |
| WO | 03/016218 A1 | 2/2003 |
| WO | 2004/010439 A1 | 1/2004 |

OTHER PUBLICATIONS

Supplementary European Search Report issued in EP Appln. No. 06782605.7-2111/1925591 (PCT/JP2006/315801), Feb. 23, 2010.

* cited by examiner

*Primary Examiner* — Steven Bos
(74) *Attorney, Agent, or Firm* — Kubovcik & Kubovcik

(57) ABSTRACT

The invention provides flaky titanic acid having polymerizable functional groups, a suspension of the same, titanic acid coating films excellent in tight adhesion, and resin bases with titanic acid coating films, namely, flaky titanic acid obtained by treating a layered titanate with an acid and then making an organic basic compound act on the obtained product to conduct interlaminar swelling or delamination, characterized in that at least part of the organic basic compound is one having a polymerizable functional group such as acryl or methacryl and, preferably, in that the layered titanate is one represented by the general formula: $A_x M_y \square_z Ti_{2-(y+z)} O_4$ [wherein A and M are different from each other and are each a mono- to trivalent metal; $\square$ represents a Ti-defective site; x is a positive real number satisfying the relationship: $0<x<1$; and y and z are 0 or positive real numbers satisfying the relationship: $0<y+z<1$].

8 Claims, No Drawings

FLAKY TITANIC ACID HAVING POLYMERIZABLE FUNCTIONAL GROUPS, SUSPENSION OF THE SAME, AND COATING FILMS MADE THEREFROM

This application is a 371 of international application PCT/JP2006/315801 filed Aug. 10, 2006, which claims priority based on Japanese patent application No. 2005-244673 filed Aug. 25, 2005, which is incorporated herein by reference.

TECHNICAL FIELD

The present invention relates to a flaky titanic acid having a polymerizable functional group and a suspension of the same, and a titanic acid coating film and a titanic acid film-coated resin substrate formed by using the same.

BACKGROUND ART

Recently, there are proposed such techniques as forming an inorganic film on various kinds of base materials for the purpose of providing various functions to the base material. As one of these techniques, Patent Document 1 discloses a flaky titanic acid suspension that is obtained by treating a layered titanate with an acid and then having a basic compound act thereon for causing interlayer swelling or separation, and a titanic acid coating film obtained by coating and drying the flaky titanic acid suspension on a base material such as a resin film. The titanic acid coating film is formed by a very simple method for forming a coating film, and, as described in the Patent Document, it is expected to exert such effects as antireflection, high dielectric constant, photocatalytic action, ultraviolet ray shielding and heat ray reflection.

As described later, Patent Documents 2-4 disclose a method for producing a layered titanate. And, as described later, Patent Documents 5 and 6 disclose a method for producing a flaky titanic acid suspension.
Patent Document 1: WO 03/016218
Patent Document 2: Japanese Patent No. 2979132
Patent Document 3: WO 99/11574
Patent Document 4: Japanese Patent No. 3062497
Patent Document 5: Japanese Patent No. 2671949
Patent Document 6: WO 03/037797

DISCLOSURE OF THE INVENTION

The purpose of the present invention is to provide a titanic acid coating film excellent in adhesion and a titanic acid film-coated resin substrate, and a flaky titanic acid having a polymerizable functional group and a suspension of the same capable of forming these.

The flaky titanic acid of the invention is a flaky titanic acid containing an organic basic compound having a polymerizable functional group between layers or on the surface thereof, which is characterized in that it is obtained by treating a layered titanate with an acid and then having an organic basic compound act thereon for causing interlayer swelling or separation, wherein at least a part of the organic basic compound has a polymerizable functional group.

The flaky titanic acid suspension in the invention is a suspension of a flaky titanic acid characterized by being a flaky titanic acid obtained by treating a layered titanate with an acid followed by having an organic basic compound act thereon for causing interlayer swelling or separation, wherein at least a part of the organic basic compound is an organic basic compound having a polymerizable functional group. Since it is possible to polymerize the polymerizable functional group by performing a heat treatment and/or UV exposure treatment after applying the flaky titanic acid suspension onto a base material, a titanic acid coating film in which respective flaky titanic acids are connected with each other is obtained. This improves dramatically the adhesion of the titanic acid coating film.

The polymerizable functional group of an organic basic compound for use in the invention is preferably selected from an acrylic group and methacrylic group from the standpoint of reactivity and easy availability.

For the flaky titanic acid for use in the invention, a part of the polymerizable functional group of the organic basic compound has preferably been substituted with a cesium ion. This can improve the light resistance of the titanic acid coating film.

The layered titanate used in the invention is one represented preferably by a formula $A_xM_y\square_zTi_{2-(y+z)}O_4$ [wherein A and M represent different monovalent to trivalent metals, and $\square$ represents a defective portion of Ti. x is a positive real number satisfying $0<x<1$, and y and z respectively represent 0 or a positive real number satisfying $0<y+z<1$]. For example, specifically, a layered titanate represented by $K_{0.5-0.8}Li_{0.27}Ti_{1.73}O_{3.85-4}$ is mentioned.

The flaky titanic acid suspension for use in the invention has a pH in the range preferably from 6 to 9. This can improve the light resistance of the titanic acid coating film.

The flaky titanic acid suspension for use in the invention contains preferably a radical initiator and/or photo polymerization initiator. This can improve the polymerization efficiency of the polymerizable functional group.

The titanic acid coating film of the invention is characterized in that it is obtained by applying the flaky titanic acid suspension of the invention onto a base material followed by subjecting the resulting product to a heat treatment and/or UV exposure treatment to polymerize the polymerizable functional group.

The titanic acid film-coated resin substrate of the invention is characterized by forming the titanic acid coating film of the invention on a resin substrate being a base material.

The resin substrate has preferably been subjected to a surface treatment from the standpoint of adhesion.

Advantage of the Invention

According to the invention, it is possible to obtain a flaky titanic acid having a polymerizable functional group and the suspension of the same, and to obtain a titanic acid coating film excellent in adhesion and a titanic acid film-coated resin substrate using these.

BEST MODE FOR CARRYING OUT THE INVENTION

Hereinafter, the present invention is described further in detail.

<Flaky Titanic Acid Suspension>

The flaky titanic acid suspension for use in the invention is characterized in that it is a suspension of a flaky titanic acid that can be obtained by treating a layered titanate with an acid followed by having an organic basic compound act thereon for causing interlayer swelling or separation, wherein a part or all of the organic basic compounds are an organic basic compound having a polymerizable functional group. A method for obtaining a flaky titanic acid suspension using an organic basic compound not having a polymerizable functional group is described in, for example, Patent Documents 1 and 5.

<Layered Titanate>

As a layered titanate to be a raw material, for example, according to the method disclosed in the Patent Document 2, cesium carbonate and titanium dioxide are mixed in a molar ratio of 1:5.3, which is burned at 800° C. to give $Cs_{0.7}Ti_{1.83}O_4$. In addition, according to the method disclosed in the Patent Document 5, potassium carbonate, lithium carbonate and titanium dioxide are mixed in K/Li/Ti=3/1/6.5 (molar ratio) and ground, and then burned at 800° C. to give $K_{0.8}Li_{0.27}Ti_{1.73}O_4$. Further, according to the method disclosed in the Patent Document 4, it is also possible to burn a mixture, which is prepared by mixing an alkali metal, or alkali metal halide or sulfate as a flux to give a flux/raw material weight ratio of from 0.1 to 2.0, at from 700 to 1200° to give a layered titanate represented by a formula $A_xM_y\square_zTi_{2-(y+z)}O_4$ [wherein A and M represent different monovalent to trivalent metals, and $\square$ represents a defective portion of Ti. x is a positive real number satisfying 0<x<1.0, and y and z respectively represent 0 or a positive real number satisfying 0<y+z<1]. A in the formula is a monovalent to trivalent metal, and is preferably at least one kind selected from K, Rb and Cs. M is a monovalent to trivalent metal different from metal A, and is preferably at least one kind selected from Li, Mg, Zn, Cu, Fe, Al, Ga, Mn, and Ni. Specific examples thereof include $K_{0.80}Li_{0.27}Ti_{1.73}O_4$, $Rb_{0.75}Ti_{1.75}Li_{0.25}O_4$, $Cs_{0.70}Li_{0.23}Ti_{1.77}O_4$, $Ce_{0.70}\square_{0.18}Ti_{1.83}O_4$, $Ce_{0.70}Mg_{0.35}Ti_{1.65}O_4$, $K_{0.8}Mg_{0.4}Ti_{1.6}O_4$, $K_{0.8}Ni_{0.4}Ti_{1.6}O_4$, $K_{0.8}Zn_{0.4}Ti_{1.6}O_4$, $K_{0.8}Cu_{0.4}Ti_{1.6}O_4$, $K_{0.8}Fe_{0.8}Ti_{1.2}O_4$, $K_{0.8}Mn_{0.8}Ti_{1.2}O_4$, $K_{0.76}Li_{0.22}Mg_{0.05}Ti_{1.73}O_4$ and $K_{0.67}Li_{0.2}A_{10.07}Ti_{1.73}O_4$. In addition, according to the method disclosed in the Patent Document 6, $K_{0.5-0.7}Li_{0.27}Ti_{1.73}O_{3.85-3.95}$ which is obtained by washing $K_{0.8}Li_{0.27}Ti_{1.73}O_4$ with an acid and then burning the resulting product, can also be utilized.

<Layered Titanic Acid>

A layered titanic acid can be obtained by, for example, treating the above-described layered titanate with an acid to substitute a changeable metal cation with a hydrogen ion or hydronium ion. An acid for use in the acid treatment is not particularly limited, and mineral acids such as hydrochloric acid, sulfuric acid, nitric acid, phosphoric acid and boric acid, and organic acids are usable. The kind of the layered titanic acid, the kind and concentration of the acid, and the slurry concentration of the layered titanic acid affect the exchange rate of the metal cation. In general, a lower acid concentration and a higher slurry concentration cause a larger amount of remaining interlayer metal cations, therefore the interlayer separation becomes not easy to give a large thickness of the flaky titanic acid after the separation. When removing metal cations is difficult, the acid treatment may repeatedly be performed according to need.

<Flaky Titanic Acid Suspension>

The flaky titanic acid suspension is obtained by having a basic compound with an interlayer swelling action act on the layered titanic acid for causing interlayer swelling or separation. On this occasion, a part or all of the organic basic compounds are indispensably an organic basic compound having a polymerizable functional group. As a method for obtaining the flaky titanic acid suspension, there are three procedures below.

(Procedure 1)

An organic basic compound (A) having an interlayer swelling action and polymerizable functional group is acted on a layered titanic acid to prepare the flaky titanic acid suspension.

(Procedure 2)

A general organic basic compound (B) having an interlayer swelling action, and the organic basic compound (A) having an interlayer swelling action and polymerizable functional group are used in combination to be acted on a layered titanic acid to prepare the flaky titanic acid suspension.

(Procedure 3)

The general organic basic compound (B) having an interlayer swelling action is acted on a layered titanic acid to prepare a flaky titanic acid suspension, to which the organic basic compound (A) having an interlayer swelling action and polymerizable functional group is then added to prepare the flaky titanic acid suspension.

Examples of the organic basic compound (A) having an interlayer swelling action and polymerizable functional group include N,N-dimethylaminopropyl acrylate, N,N-diethylaminopropyl acrylate, N,N-dimethylaminoethyl methacrylate, N,N-diethylaminoethyl methacrylate, N,N-dimethylaminopropyl methacrylate, N,N-diethylaminopropyl methacrylate, N,N-dimethylaminobutyl methacrylate, N,N-dimethylaminoethyl acrylate, N,N-dimethylaminopropyl acrylamide, N,N-dimethylaminoethyl acrylamide, N,N-dimethylaminopropyl methacrylamide, acryloyl morpholine, N-2-hydroxy-3-acryloyloxypropyl-N,N-dimethylamine, and N-3-methacryloyloxypropyl-2-hydroxypropyl-N,N-diethylamine. Particularly preferable are N,N-dimethylaminopropyl acrylamide and N,N-dimethylaminopropyl methacrylamide.

Examples of the general organic basic compound (B) having an interlayer swelling action include primary to tertiary amines and salts thereof, alkanolamines and salts thereof, quaternary ammonium salts, phosphonium salts, and amino acids and salts thereof. Examples of the primary amine include methylamine, ethylamine, n-propylamine, butylamine, pentylamine, hexylamine, octylamine, dodecylamine, stearylamine, 2-ethyl-hexyl amine, 3-methoxypropyl amine, 3-ethoxypropyl amine, and salts thereof. Examples of the secondary amine include diethylamine, dipentylamine, dioctylamine, dibenzylamine, di(2-ethyl hexyl)amine, di(3-ethoxypropyl)amine, and salts thereof. Examples of the tertiary amine include triethylamine, trioctylamine, tri(2-ethyl hexyl)amine, tri(3-ethoxypropyl)amine, dipolyoxyethylene dodecylamine, and salts thereof. Examples of the alkanolamine include ethanolamine, diethanolamine, triethanolamine, isopropanolamine, diisopropanolamine, triisopropanolamine, N,N-dimethylethanolamine, 2-amino-2-methyl-1-propanol, and salts thereof. Examples of the quaternary ammonium salt hydroxide include tetramethylammonium hydroxide, tetraethylammonium hydroxide, tetrapropylammonium hydroxide and tetrabutylammonium hydroxide. Examples of the quaternary ammonium salt include dodecyltrimethylammonium salts, cetyltrimethylammonium salts, stearyltrimethylammonium salts, benzyltrimethylammonium salts, benzyltributylammonium salts, trimethylphenyl ammonium salts, dimethyldistearyl ammonium salts, dimethyldidecyl ammonium salts, dimethylstearylbenzyl ammonium salts, dodecylbis(2-hydroxyethyl)methyl ammonium salts, trioctylmethyl ammonium salts, and dipolyoxyethylenedodecylmethyl ammonium salts.

Examples of the phosphonium salt include organic phosphonium salts such as tetrabutylphosphonium salt, hexadecyltributyl phosphonium salt, dodecyltrobutyl phosphonium salt, and dodecyltriphenyl phosphonium salt. In addition, amino acids such as 12-aminododecanic acid and aminocapronic acid, and salts thereof, and imines such as polyethyleneimine and salts thereof are also usable.

Particularly preferable are ethylamine, n-propylamine and dimethylethanolamine.

These basic compounds may be used in one kind or in several kinds in combination according to a purpose. In particular, a single basic compound with a high hydrophobicity does not enable the separation to proceed sufficiently, and, therefore, the use of a basic compound with a high hydrophilicity in combination is preferable.

In order to have a basic compound with an interlayer swelling action act thereon, a basic compound or a basic compound diluted with a water-based medium may be added with stirring to a suspension formed by dispersing a layered titanic acid having been subjected to an acid treatment or a warm-water treatment into a water-based medium. Or, the layered titanic acid or a suspension thereof may be added to a water-based solution of the basic compound.

The water-based medium or water-based solution means water, solvents soluble in water, or mixed solvents of water and a solvent soluble in water, or solutions using these.

Examples of the solvent soluble in water include alcohols such as methyl alcohol, ethyl alcohol and isopropyl alcohol, ketones such as acetone, ethers such as tetrahydrofuran and dioxane, nitrites such as acetonitrile, and esters such as ethyl acetate and propylene carbonate.

The addition amount of the basic compound is determined so as to give from 0.3 to 10 equivalent weights relative to the ion-exchange capacity of a layered titanate, preferably from 0.5 to 2 equivalent weights. Here, the ion-exchange capacity means the amount of exchangeable metal cations. For example, when a layered titanate is represented by a formula $A_xM_y\square_zTi_{2-(y+z)}O_4$ and the valencies of A and M are denoted by m and n, respectively, it means a value represented by mx+ny.

In order to obtain the flaky titanic acid suspension in Procedure (1), it is sufficient to have the organic basic compound (A) having an interlayer swelling action and polymerizable functional group act on a layered titanic acid.

In order to obtain the flaky titanic acid suspension in Procedure (2), it is sufficient that the organic basic compound (A) having an interlayer swelling action and polymerizable functional group, and the general organic basic compound (B) having an interlayer swelling action are used in combination to be acted on a layered titanic acid. In this case, the total amount of the organic basic compounds (A) and (B) is set to give from 0.3 to 2 equivalent weights relative to the ion exchange capacity of the layered titanate, preferably from 0.5 to 1 equivalent weight. The addition amount of the organic basic compound (A) is preferably 0.3 equivalent weight or more relative to the ion exchange capacity of the layered titanate, further preferably 0.5 equivalent weight or more.

In order to obtain the flaky titanic acid suspension in Procedure (3), it is sufficient that the general organic basic compound (B) having an interlayer swelling action is acted on the layered titanic acid to prepare a flaky titanic acid suspension, and that the organic basic compound (A) having an interlayer swelling action and polymerizable functional group is added additionally to the suspension. In this case, the organic basic compound (B) is set to give from 0.3 to 2 equivalent weights relative to the ion exchange capacity of the layered titanate, preferably from 0.5 to 1 equivalent weight. And, the addition amount of the organic basic compound (A) is set to give preferably 0.3 equivalent weight or more relative to the ion exchange capacity of the layered titanate, further preferably 0.5 equivalent weight or more.

The average major axis of the flaky titanic acid is preferably from 1 to 100 μm, further preferably from 10 to 50 μm, and the average thickness thereof is preferably from 0.5 nm to 2 μm, further preferably from 1 nm to 1 μm.

For the average major axis of the flaky titanic acid, the average major axis of a layered titanate being a raw material is approximately kept in so far as no stirring with a strong shear force is performed in a process of performing the interlayer separation by having a basic compound act thereon.

The average major axis of a flaky titanic acid of less than 1 μm makes it not easy to form an even coating film, and that of more than 100 μm makes the synthesis of a layered titanate being a raw material difficult.

The average thickness of the flaky titanic acid is around 0.5 nm when it is separated down to a single layer. When it is more than 2 μm, a flaky titanic acid suspension can not keep a uniform dispersion state and the flaky titanic acid might begin to precipitate.

The concentration of the flaky titanic acid suspension is preferably from 0.01 to 50% by weight in terms of the solid content concentration of the flaky titanic acid, further preferably from 0.1 to 10% by weight. When the concentration is less than 0.01% by weight, the coating film is not formed easily because the viscosity of the suspension is low, and when it is more than 50% by weight, the handling thereof becomes difficult because the viscosity thereof is high.

The flaky titanic acid suspension for use in the invention has generally a pH in the range of from 6 to 12 after the action of a basic compound for causing interlayer swelling or separation, but, more preferably, the pH thereof is adjusted in the range of from 6 to 9 by removing an excess basic compound by washing the same with water, or by neutralizing an excess basic compound using at least one kind of acid selected from phosphoric acids, water-soluble carboxylic acid compounds, boric acid and carbon dioxide. The use of one having a pH in the range of from 6 to 9 can improve the light resistance of a formed titanic acid film. When the pH is 6 or less, the flaky titanic acid begins to aggregate, to damage the dispersibility. Further, when an acid other than the above described ones, for example, a mineral acid such as hydrochloric acid or sulfuric acid is used for the neutralization, the flaky titanic acid begins to aggregate as well, to damage the dispersibility.

When removing an excess basic compound by washing with water, it is sufficient to repeat several times such operation as subjecting the flaky titanic acid suspension to centrifugal separation to remove the supernatant, followed by rediluting the concentrated flaky titanic acid dispersion that has been spun down with deionized water. The condition of the centrifugal separation is preferably from 5000 to 20000 rpm for from 5 minutes to 1 hour.

When the neutralization thereof is performed, at least one kind of acid selected from phosphoric acids, water-soluble carboxylic acid compounds, boric acid and carbon dioxide can be employed. As the phosphoric acid, for example, orthophosphoric acid, pyrophosphoric acid, methaphosphoric acid, and polyphosphoric acid can be used. As the water-soluble carboxylic acid compound, for example, formic acid, acetic acid, propionic acid, oxalic acid, malonic acid, glycolic acid, lactic acid and malic acid can be used.

When neutralizing the flaky titanic acid suspension, at least one kind of acid selected from the above or an aqueous solution thereof may be added while stirring the suspension, or carbon dioxide may be bubbled. A neutralized salt of a basic compound to be generated is preferably removed by centrifugal washing or the like.

The flaky titanic acid in the invention may also be a flaky titanic acid that is obtained by the action of an organic basic compound for causing interlayer swelling or separation, followed by substituting a part of the organic basic compound with a cesium ion in an aqueous medium. By using the flaky titanic acid substituted with a cesium ion in this way, the light resistance of the formed composite titanic acid film can be improved. In order to substitute the organic basic compound with a cesium ion, it is sufficient to add a water-soluble cesium salt to the flaky titanic acid suspension and stir the resulting product for around 1 hour. As the water-soluble cesium salt, for example, cesium carbonate, cesium chloride, cesium nitrate, cesium acetate, cesium sulfate, cesium fluoride, or cesium hydroxide can be used. Among these, cesium carbonate is most preferable. The addition amount of the cesium salt is preferably from 0.1 to 0.5 equivalent weight relative to the ion-exchange capacity of the layered titanate described later, further preferably from 0.1 to 0.3 equivalent weight. When it is less than 0.1 equivalent weight, the amount of the organic basic compound substituted with a cesium ion is insufficient and, when it is more than 0.5 equivalent weight, the organic basic compound (A) might not be able to remain.

An excess cesium salt and desorbed organic basic compound are desirably removed by centrifugal washing or the like after the treatment.

The flaky titanic acid suspension for use in the invention contains preferably a radical polymerization initiator and/or photo polymerization initiator. This can improve the polymerization efficiency of the polymerizable functional group.

Examples of the radical polymerization initiator include redox initiators such as persulfates such as ammonium persulfate, hydrogen peroxide, or those consisting of a combination of these and reducing agents such as sodium sulfite and sodium thiosulfate, peroxides such as disuccinic acid peroxide, diglutaric acid peroxide, benzoyl peroxide, di-t-butyl peroxide and cumene hydroperoxide, azo compounds such as 2,2'-azobisisobutyronitrile, 2,2'-azobis-(2,4-dimethylvaleronitrile), 2,2'-azobis-(4-methoxy-2,4-dimethylvaleronitrile), isobutyronitrileazobisisobutylamidine dichloride, 2,2'-azobis(2-methylpropylamidine) dichloride and 4,4'-azobis-4-cyanovaleric acid, and, in particular, 2,2'-azobis(2-methylpropylamidine) dichloride and 4,4'-azobis-4-cyanovaleric acid are preferable.

Examples of the photo polymerization initiator include benzoin methyl ether, benzoin ethyl ether, benzoin butyl ether, diethoxyacetophenone, benzyldimethylketal, 2-hydroxy-2-methylpropyophenone, benzophenone, 2,4,6-trimethylbenzoindiphenylphosphine oxide, 2-benzyl-2-dimethyl-amino-1-(4-morpholinophenyl)-butane-1-one, ethoxylated 2-hydroxy-2-methyl-1-phenyl-propane-1-one, 1-[4-(2-hydroxyethoxy)-phenyl]-2-hydroxy-2-methyl-1-propane-1-one, Michler's ketone, isoamyl N,N-dimethylaminobenzoate and 2-chlorothioxanthone, and, in particular, ethoxylated 2-hydroxy-2-methyl-1-phenyl-propane-1-one and 1-[4-(2-hydroxyethoxy)-phenyl]-2-hydroxy-2-methyl-1-propane-1-one are preferable.

Each of these initiators may be used singly, or two or more kinds thereof may suitably be used in combination. The use amount is from 0.1 to 10% by weight relative to the solid content of the flaky titanic acid, preferably from 1 to 5% by weight.

<Formation of a Titanic Acid Film>

For the formation of the titanic acid film in the invention, general methods such as roll coating, gravure coating, knife coating, dip coating and spray coating can be utilized. By applying the flaky titanic acid suspension of the invention onto a base material followed by a heat treatment and/or UV exposure treatment to remove the solvent and, at the same time, to polymerize the polymerizable functional group, it is possible to obtain a titanic acid coating film in which the flaky titanic acids are strongly connected with each other.

The heat treatment temperature is from 60 to 200° C., preferably from 80 to 120° C., and the heat treatment time is from 1 minute to 3 hours, preferably from 5 minutes to 1 hour.

The exposure amount of the UV is from 10 to 5000 mJ/$cm^2$, preferably from 100 to 2000 mJ/$cm^2$. As a UV light source, a xenon lamp, high-pressure mercury lamp, low-pressure mercury lamp, metal halide lamp, carbon arc lamp, tungsten lamp and the like can be used.

In the formation of the titanic acid film, a heat treatment is indispensable because the solvent of the applied flaky titanic acid suspension must be removed. The UV exposure may be performed after the heat treatment or along with the heat treatment.

The thickness of the titanic acid film is preferably from 0.01 to 100 µm, further preferably from 0.1 to 20 µm. When it is less than 0.01 µm, an expected effect may not be obtained, and, when it is more than 100 µm, cracks may occur in the coating film due to volume contraction resulting from the polymerization reaction.

<Resin Substrate>

The base material for use in the invention is not particularly limited, and glass, ceramics, metals, resin films and the like can be used. Among these, from the standpoint of the effect expected for the titanic acid coating film, in particular, resin substrates are preferable. The resin substrate is not particularly limited. Specific examples of the resin include single kind of polyolefin-based resin, acrylic-based resin, polyamide-based resin, polyurethane-based resin, polyester-based resin, polystyrene-based resin, polyacetal-based resin, polystyrene-based resin, polycarbonate-based resin, silicone-based resin, epoxy-based resin, melamine-based resin, cellulose-based resin, polyvinyl alcohol-based resin, urea-based resin, phenol-based resin, fluorine-containing resin and polybutadiene-based resin, and composite resins thereof.

From the standpoint of the adhesion, the resin base material has preferably been subjected to a surface treatment. The method of surface treatment is not particularly limited, and, for example, an ultraviolet treatment, corona discharge treatment, glow discharge treatment, flame treatment, high-frequency treatment, active plasma treatment, laser treatment, mechanical treatment, mixed acid treatment and ozone oxidation treatment can be used.

Further, a polymer, dispersant, surfactant, organic or inorganic sol and the like may be added to the flaky titanic acid suspension, in the range that does not damage the purpose, to form the titanic acid film.

EXAMPLES

Hereinafter, the present invention is described specifically while referring to Examples and Comparative Examples, but the invention is not at all limited to the following Examples. In what follows, "%" and "part" mean those on the basis of weight, if not otherwise specified.

<Synthesis of a Flaky Titanic Acid Suspension>

Synthesis Example 1

A raw material obtained by pulverizing and mixing 67.01 g of titanium oxide, 26.78 g of potassium carbonate, 12.04 g of potassium chloride and 5.08 g of lithium hydroxide by a dry system was burned at 1020° C. for 4 hours. For the obtained powder, 7.9 kg of a 10.9% aqueous slurry was prepared, to which 470 g of a 10% aqueous sulfuric acid solution was added and stirred for 2 hours to give a slurry of pH 7.0. The separated and washed material was dried at 110° C., and then burned at 600° C. for 12 hours. The obtained white powder was a layered titanate, $K_{0.5}Li_{0.27}Ti_{1.73}O_{3.9}$, having an average major axis of 15 μm.

65 g of the layered titanate was dispersed into 5 kg of 3.5% hydrochloric acid, which was stirred and reacted at 40° C. for 2 hours, followed by separation by suction filtration and washing with water. The remaining amount of $K_2O$ in the obtained layered titanic acid was 2.0%, and the metal ion exchange rate was 94%.

The whole amount of the obtained layered titanic acid was dispersed into 1.6 kg of deionized water with stirring, to which a solution prepared by dissolving 63.4 g (equivalent to 1 equivalent weight relative to the ion exchange capacity of the layered titanate) of N,N-dimethylaminopropyl methacrylamide in 0.4 kg of deionized water was added and stirred at 40° C. for 12 hours to give a flaky titanic acid dispersion having pH 9.5. By centrifuging the dispersion at 10000 rpm for 10 minutes, the concentration thereof was adjusted to give 5.0% by weight. As a photo polymerization initiator, ethoxylated 2-hydroxy-2-methyl-1-phenyl-propane-1-one (trade name: Chivacure 73W, manufactured by DOUBLE BOND CHEMICAL) was added thereto in 5% by weight relative to the solid content of the flaky titanic acid. For the obtained flaky titanic acid dispersion A, no precipitation of a solid content was observed even after being left at rest for a long time. A solid content obtained after the drying at 110° C. for 12 hours showed a weight decrease of 28.9% by weight for 200° C. or more by TG/DTA analysis, and an interlayer distance of 15.4 Angstroms by XRD analysis.

Synthesis Example 2

A flaky titanic acid dispersion having a pH of 10.8 and concentration of 5.0% by weight was prepared by the same method as in Synthesis example 1, except for replacing the organic basic compound by 11.4 g (equivalent to 0.5 equivalent weight relative to the ion exchange capacity of the layered titanate) of n-propylamine and 31.7 g (equivalent to 0.5 equivalent weight relative to the ion exchange capacity of the layered titanate) of N,N-dimethylaminopropyl methacrylamide used in combination. To the resulting product, 5% by weight of the same photo polymerization initiator as one used in Synthesis example 1 was added. For the flaky titanic acid dispersion B, no precipitation of a solid content was observed even after being left at rest for a long time.

Synthesis Example 3

A flaky titanic acid was obtained by the same method as in Synthesis example 1, using 22.8 g (equivalent to 1.0 equivalent weight relative to the ion exchange capacity of the layered titanate) of n-propylamine as an organic basic compound. Then, 31.7 g (equivalent to 0.5 equivalent weight relative to the ion exchange capacity of the layered titanate) of N,N-dimethylaminopropyl methacrylamide was added thereto to prepare a flaky titanic acid dispersion having a pH of 11.3 and concentration of 5.0% by weight by the same method as in Synthesis example 1. To the resulting product, 5% by weight of the same photo polymerization initiator as one in Synthesis example 1 was added. For the obtained flaky titanic acid dispersion C, no precipitation of a solid content was observed even after being left at rest for a long time.

Synthesis Example 4

A flaky titanic acid dispersion having a pH of 9.6 and concentration of 5.0% by weight was prepared by the same method as in Synthesis example 1, except for replacing the photo polymerization initiator by a radical polymerization initiator, 2,2'-azobis(2-methylpropylamidine) dichloride. For the obtained flaky titanic acid dispersion D, no precipitation of a solid content was observed even after being left at rest for a long time.

Synthesis Example 5

To the flaky titanic acid dispersion obtained in Synthesis example 1, carbon dioxide was bubbled to give a pH of 7.9, which was centrifuged at 10000 rpm for 10 minutes and the supernatant was removed. Then the resulting product was dediluted with deionized water to give a concentration of 5.0% by weight, to which 5% by weight of the same photo polymerization initiator as in Synthesis example 1 was added. For the obtained flaky titanic acid dispersion E, no precipitation of a solid content was observed even after being left at rest for a long time.

Synthesis Example 6

200 g of the flaky titanic acid dispersion in Synthesis example 1 was adjusted to give a concentration of 1.7% by weight with deionized water. To the resulting product, 72 g (equivalent to the 0.3 equivalent weight relative to the ion exchange capacity of the layered titanate) of a 5% by weight aqueous cesium carbonate solution was added with stirring, which was stirred at room temperature for 1 hour to substitute the interlayer ion of the flaky titanic acid from N,N-dimethylaminopropyl methacrylamide to a cesium ion. Then, by repeating three times such an operation as centrifuging the dispersion at 10000 rpm for 10 minutes and removing the supernatant followed by rediluting the precipitated concentrated flaky titanic acid dispersion with deionized water, an excess cesium carbonate and desorbed N,N-dimethylaminopropyl methacrylamide were removed with the supernatant to give a flaky titanic acid dispersion having an adjusted concentration of 5.0% by weight and a pH of 8.5. By further bubbling carbon dioxide, the pH was adjusted to give 7.9, and by centrifuging again the resulting product, the concentration was adjusted to give 5.0% by weight, to which 5% by weight of the same photo polymerization initiator as that in Synthesis example 1 was added. For the obtained flaky titanic acid dispersion F, no precipitation of a solid content was observed even after being left at rest for a long time. A solid content obtained after the drying at 110° C. for 12 hours showed a weight decrease of 9.6% by weight for 200° C. or more by TG/DTA analysis, an interlayer distance of 9.3 Angstroms by XRD analysis, and a $Cs_2O$ content of 17.6% by weight (equivalent to 0.2 equivalent weight relative to the ion exchange capacity of the layered titanate) by fluorescent X-ray analysis.

Synthesis Example 7

A flaky titanic acid dispersion having a pH of 9.8 and concentration of 5.0% by weight was prepared by the same method as in Synthesis example 1, except for replacing the organic basic compound by 34.5 g (equivalent to 1 equivalent weight relative to the ion exchange capacity of the layered titanate) of dimethylethanolamine. For the obtained flaky titanic acid dispersion G, no precipitation of a solid content was observed even after being left at rest for a long time.

<Preparation of a Titanic Acid Coating Film>

Example 1

The flaky titanic acid suspension A obtained in Synthesis example 1 was applied onto a PET (polyethylene terephthalate) substrate (thickness: 75 μm), the surface of which had been corona-treated, with a film applicator, which was heat-treated at 100° C. for 10 minutes. The resulting product was subjected to a UV exposure of 600 mJ/cm$^2$ using a high-pressure mercury lamp having an output density of 120 W/cm at a position of 10 cm under the light source, to prepare a titanic acid coating film having a thickness of 2 μm.

Examples 2 and 3

A titanic acid coating film was prepared in the same method as in Example 1 using flaky titanic acid dispersions B and C in Synthesis examples 2 and 3.

Example 4

A titanic acid coating film was prepared by applying the flaky titanic acid dispersion D in Synthesis example 4 onto a PET substrate (thickness: 75 μm), the surface of which had been corona-treated, with a film applicator followed by a heat treatment at 100° C. for 1 hour.

Examples 5 and 6

A titanic acid coating film was prepared in the same method as in Example 1 using flaky titanic acid dispersions E and F in Synthesis Examples 5 and 6.

Comparative Example

A titanic acid coating film was prepared in the same method as in Example 4 using the flaky titanic acid dispersion G in Synthesis Example 7.

<Evaluation of Coating Film Hardness and Adhesion>

For titanic acid coating films in Examples 1 to 6 and Comparative Example 1, coating film hardness, adhesion and light resistance were evaluated by testing methods below. Results thereof are shown in Table 1.

[Coating Film Hardness]

A pencil hardness test was performed according to JIS S-6006 to evaluate the coating film hardness.

[Adhesion]

A cross-cut tape test was performed according to JIS D-0202. That is, 100 grids of 1 mm$^2$ were formed on the surface of the titanic acid coating film with a knife, on which an adhesive tape was pressed strongly, and then the tape was quickly pulled up to be peeled off in 90° direction from the surface. Then, the ratio of the number of grids remaining on the titanic acid coating film was defined as an index of adhesion.

[Light Resistance]

For the titanic acid coating film, a 300-hour accelerated light resistance test was performed using a dual cycle sunshine weather meter WEL-SUN-DC (manufactured by SUGA TEST INSTRUMENTS, black panel temperature: 60° C.), to evaluate light resistance using the variation of color difference (ΔE) from the beginning.

TABLE 1

|  | Flaky Titanic Acid Suspension | Pencil Hardness | Adhesion | Light Resistance |
| --- | --- | --- | --- | --- |
| Example 1 | A | 4H | 100/100 | 5.1 |
| Example 2 | B | 3H | 100/100 | 6.3 |
| Example 3 | C | 3H | 100/100 | 6.8 |
| Example 4 | D | 4H | 100/100 | 5.2 |
| Example 5 | E | 4H | 100/100 | 1.1 |
| Example 6 | F | 3H | 100/100 | 0.5 |
| Comp. Ex. | G | 2H | 52/100 | 5.5 |

As shown in Table 1, it is understood that titanic acid coating films in Examples 1 to 6 according to the invention have an improved coating film hardness and adhesion as compared with those in Comparative Example. Further, it is understood that those in Examples 5 and 6 are excellent in light resistance, and that the neutralization treatment or substitution treatment by a cesium ion improves the light resistance.

The invention claimed is:

1. A flaky titanic acid containing an organic basic compound having a polymerizable functional group between layers of the flaky titanic acid or on a surface of the flaky titanic acid and obtained by treating a layered titanate with an acid to obtain a layered titanic acid and contacting the layered titanic acid with an organic basic compound, wherein at least a part of the organic basic compound is the organic basic compound having a polymerizable functional group, to cause interlayer swelling or separation between the layers of the layered titanic acid and to produce said flaky titanic acid.

2. The flaky titanic acid according to claim 1, wherein the polymerizable functional group is selected from the group consisting of an acrylic group and a methacrylic group.

3. The flaky titanic acid according to claim 1, wherein a part of the organic basic compound is substituted with a cesium ion.

4. The flaky titanic acid according to claim 1, wherein the layered titanate is represented by a formula $A_xM_y\square_zTi_{2-(y+z)}O_4$ wherein A and M represent different monovalent to trivalent metals, and $\square$ represents a defective portion of Ti, is a positive real number satisfying $0<x<1$, and y and z respectively represent 0 or a positive real number satisfying $0<y+z<1$.

5. The flaky titanic acid according to claim 1, wherein the layered titanate is represented by $K_{0.5-0.8}Li_{0.27}Ti_{1.73}O_{3.65-4}$.

6. A flaky titanic acid suspension, wherein the flaky titanic acid as described in claim 1 is dispersed in an aqueous medium.

7. The flaky titanic acid suspension according to claim 6, having a pH in the range of from 6 to 9.

8. The flaky titanic acid suspension according to claim 6, comprising a radical polymerization initiator and/or a photo polymerization initiator.

* * * * *